United States Patent
Skovira

(10) Patent No.: US 7,076,781 B2
(45) Date of Patent: Jul. 11, 2006

(54) RESOURCE RESERVATION FOR LARGE-SCALE JOB SCHEDULING

(75) Inventor: Joseph F. Skovira, Owego, NY (US)

(73) Assignee: International Business Machines Corporation, Armonk, NY (US)

( * ) Notice: Subject to any disclaimer, the term of this patent is extended or adjusted under 35 U.S.C. 154(b) by 692 days.

(21) Appl. No.: 10/160,280

(22) Filed: May 31, 2002

(65) Prior Publication Data

US 2004/0015973 A1    Jan. 22, 2004

(51) Int. Cl.
 G06F 9/46 (2006.01)
(52) U.S. Cl. ............. 718/102; 718/103; 718/104; 718/105; 718/106; 718/107
(58) Field of Classification Search ........ 718/100–108; 709/201
See application file for complete search history.

(56) References Cited

U.S. PATENT DOCUMENTS

| | | | |
|---|---|---|---|
| 3,648,253 A * | 3/1972 | Mullery et al. ............. 718/100 |
| 5,528,513 A * | 6/1996 | Vaitzblit et al. ............. 718/103 |
| 5,640,563 A * | 6/1997 | Carmon ....................... 718/102 |
| 5,671,361 A | 9/1997 | Brown et al. |
| 5,826,080 A * | 10/1998 | Dworzecki ................... 718/103 |
| 5,881,284 A | 3/1999 | Kubo |
| 5,946,498 A | 8/1999 | Chiang et al. |
| 6,014,760 A | 1/2000 | Silva et al. |
| 6,041,354 A | 3/2000 | Biliris et al. |
| 6,134,516 A | 10/2000 | Wang et al. |
| 6,145,031 A | 11/2000 | Mastie et al. |
| 6,154,769 A | 11/2000 | Cherkasova et al. |
| 6,157,963 A | 12/2000 | Courtright, II et al. |
| 6,182,120 B1 | 1/2001 | Beaulieu et al. |
| 6,189,022 B1 * | 2/2001 | Binns .......................... 718/100 |
| 6,223,201 B1 * | 4/2001 | Reznak ........................ 718/102 |
| 6,263,358 B1 | 7/2001 | Lee et al. |
| 6,263,359 B1 | 7/2001 | Fong et al. |

(Continued)

FOREIGN PATENT DOCUMENTS

EP        0762275 A2        3/1997

(Continued)

OTHER PUBLICATIONS

Rajkumar et al., "Resource Sharing In Reservation-Based System", IEEE, 2001, pp. 130-131.*

(Continued)

Primary Examiner—Meng-Ai T. An
Assistant Examiner—Jennifer N. To
(74) Attorney, Agent, or Firm—Lawrence D. Cutter; Jeffrey N. Giunta; Fleit, Kain, Gibbons, Gutman, Bongini & Bianco P.L.

(57) ABSTRACT

A method is provided for scheduling software task execution. According to the method, at least one high priority software task that has a specified start time and at least one lower priority software task are accepted. There is determined a time remaining until the specified start time for the high priority software task, and there is determined if the lower priority software task can complete execution within the time remaining that was determined. The lower priority software task is executed only if it was determined to be able to complete execution within the time remaining, and the high priority software task is executed at or very near the specified start time. In a preferred embodiment, all incoming software tasks are placed on a task queue with a status of hold to prevent execution.

15 Claims, 5 Drawing Sheets

U.S. PATENT DOCUMENTS

| | | | |
|---|---|---|---|
| 6,272,606 B1 | 8/2001 | Dorricott et al. | |
| 6,349,321 B1* | 2/2002 | Katayama | 718/103 |
| 6,353,844 B1* | 3/2002 | Bitar et al. | 718/102 |
| 6,463,457 B1* | 10/2002 | Armentrout et al. | 709/201 |
| 6,578,005 B1* | 6/2003 | Lesaint et al. | 705/8 |
| 6,662,203 B1* | 12/2003 | Kling et al. | 718/103 |
| 6,748,444 B1* | 6/2004 | Nagashima | 709/236 |
| 6,757,897 B1* | 6/2004 | Shi et al. | 718/102 |
| 2001/0042090 A1* | 11/2001 | Williams | 709/102 |
| 2002/0194248 A1* | 12/2002 | Wood et al. | 709/102 |
| 2003/0115239 A1* | 6/2003 | Togawa | 709/102 |
| 2003/0200252 A1* | 10/2003 | Krum | 709/102 |
| 2005/0005273 A1* | 1/2005 | Jones et al. | 718/108 |

FOREIGN PATENT DOCUMENTS

| | | |
|---|---|---|
| JP | 11312149 A | 11/1999 |
| JP | 2001007810 A | 1/2001 |

OTHER PUBLICATIONS

Hamidzadeh et al., "Dynamic Task Scheduling Using Online Optimization", IEEE, 2000, pp. 1151-1163.*
U.S. Appl. No. 09/618,920, Curry et al.
U.S. Appl. No. 09/816,282, Ben-Shachar et al.
U.S. Appl. No. 09/976,126, Dingsor et al.

* cited by examiner

500

| TASK QUEUE | | TIME = 6 PM | FREE NODES=1 | |
|---|---|---|---|---|
| TASK ID | NODES | EXEC TIME | START TIME | STATE |
| J100 | 6 | 14 HOURS | | RUN |
| J200 | 1 | 10 HOURS | | RUN |
| J1 | 1 | 10 HOURS | | IDLE>RUN |
| J2 | 4 | 2 | | IDLE |
| H1 | 8 | 5 | 8 AM | DEFER |
| J3 | 2 | 1 | | IDLE |
| J4 | 4 | 6 | | IDLE |

FIG. 5A      502

| TASK QUEUE | | TIME = 4 AM | FREE NODES=2 | |
|---|---|---|---|---|
| TASK ID | NODES | EXEC TIME | START TIME | STATE |
| J100 | 6 | 14 HOURS | | RUN |
| ~~J200~~ | ~~1~~ | ~~10 HOURS~~ | | COMPLETE |
| ~~J1~~ | ~~1~~ | ~~10 HOURS~~ | | COMPLETE |
| J2 | 4 | 2 | | IDLE |
| H1 | 8 | 5 | 8 AM | DEFER |
| J3 | 2 | 1 | | IDLE > RUN |
| J4 | 4 | 6 | | SYSHOLD |

FIG. 5B      504

| TASK QUEUE | | TIME = 8 AM | FREE NODES=8 | |
|---|---|---|---|---|
| TASK ID | NODES | EXEC TIME | START TIME | STATE |
| ~~J100~~ | ~~6~~ | ~~14 HOURS~~ | | COMPLETE |
| J2 | 4 | 2 HOURS | | IDLE |
| H1 | 8 | 5 | 8 AM | DEFER |
| J4 | 4 | 6 | | SysHold |

FIG. 5C      506

```
Do forever                                              600
   For all queued jobs
      If (class = Hi and if state = NotRunning)
         Save job in queue time order on PotentialHi array
      Else
         Save job on PotentialOther array
      Endif
   Endfor If (the first entry in PotentialHi exists)  # i.e., get the first Hi priority job on the queue
      Determine when this job needs to start (read the value of StartDate)
      Compute CountDown = StartDate-Now
      For all jobs in PotentialOther (which is also sorted by queue time order)
         If (WallClock < CountDown) # the job is within the window and allowed to run
            If (ThisJob is on System Hold)
               Remove the system hold (allows the job to run if resources are available)
            Endif
         Else the job is outside the window of opportunity and not allowed to run now
            If (ThisJob is idle) # that is, if this job is not starting, running, or completing
               Place the job on system hold to prevent it from running
            Endif
         End of WallClock test
      End for – end of loop for all PotentialOther jobs Else there are currently no high priority jobs on the system

Remove all system holds for jobs on the PotentialOther array
      For all the jobs on the PotentialOther array
         If the job is on system hold
            Remove the system hold
         Endif
      Endfor
   Endif – end of these for the first job on PotentialHi array Sleep for some time (eg 10 seconds)
End of forever loop
```

FIG. 6

RESOURCE RESERVATION FOR LARGE-SCALE JOB SCHEDULING

BACKGROUND OF THE INVENTION

1. Field of the Invention

The present invention relates to computer systems, and more specifically to a system and method for managing execution of computer program tasks.

2. Description of Related Art

Large computing systems have software task management facilities that accept batch processing software tasks, which are sometimes referred to as "jobs," queue these jobs with or without prioritization relative to each other and then submit the jobs for execution as computing resources become available. These batch processing software tasks are often data processing intensive tasks that operate without human input or control once the structure of the software task is defined. Batch processing software tasks typically operate upon pre-computed or prepared data that is stored on or available to the computing system upon which the software tasks execute. Some software tasks operate on data that has been prepared by another software task, thereby requiring completion of the software task that prepares the data prior to the starting of the execution of the software task that will use that prepared data. Conventional software task management techniques include the ability to schedule such phasing of software task executions.

Some software tasks are computationally intensive and require a large amount of time to completely execute. An example of such a software task is a weather modeling program. Weather modeling tasks can take hours to execute. These weather modeling tasks are often required to be complete by a certain time in order to ensure that the weather model data (i.e., result) is available for a scheduled presentation. These weather modeling software tasks are also required to begin execution after a certain time when the input data is certain to be available. These two requirements can place tight limitations on the time when the weather modeling software task can begin execution. Such weather modeling software tasks are also often required to operate on computing systems that host software tasks from many users requiring various amounts of time to execute. These other software tasks may also be computationally intensive and require a considerable amount of time to execute. The accuracy with which a particular software task, such as a weather modeling processing task, is able to be initiated at a specified time is therefore limited when these software tasks share computing facilities with other software tasks that require a long time to execute.

Computing facilities that perform the processing for software tasks that require a long time to execute frequently consist of a number of computer systems that are interconnected. These interconnected computing system are able to be computer "clusters," which are groups of computers that are interconnected via high speed communications between all computers of the cluster, or just a number of computers connected via electronic communications. The interconnected computers that form these computing facilities often have a central software task management system, that can be referred to as a "software task manager" for simplicity, in order to efficiently utilize the several interconnected computers. Conventional software task management systems are able to associate a priority with each software task that specifies the priority of that task relative to other software tasks that are to be executed. Software tasks are typically received by the software task manager and submitted for execution on the one or more computers that make up the interconnected computer system. When all of the computers are busy, conventional software task managers queue newly received software tasks for execution when the resources it requires become available.

The software task manager bases its selection of the next software task to submit for execution upon the priority that is assigned to the software tasks. Current software tasks managers are able to estimate the computational resource requirements for each software task and include this estimate in the selection of the next software task to be submitted for execution in an attempt to maintain an equal loading on all of the interconnected computers that are controlled by the software task manager.

Software task managers maintain prioritized queues of software tasks that have been received and are to be executed. Heavily utilized computing systems typically have a large number of software tasks waiting in one or more queues. Some software managers allow the status of a queued software task to be specified when the software task is submitted to the software task manager. A software task may be submitted with a status of "on hold," whereby the software task is maintained within the queue but is not to be submitted to a computer for execution. These software managers also provide external interfaces that allow external processes to affect the status of software tasks that are in the queue maintained by the software task manager. One control of queued software tasks is to change the status of a queued software task from "on hold" to "idle." An "idle" software task will be submitted to a computer for execution when computing resources become available. Many software managers restrict the ability to change the status of a queued task to specific or privileged users.

Despite the features available in current software task managers, there is needed an effective way to operate a computer system that processes software tasks so that a particular task is able to start at or very near a particular time.

SUMMARY OF THE INVENTION

In view of these drawbacks, it is an object of the present invention to remove the above-mentioned drawbacks and to provide systems and methods for resource reservation for large scale job scheduling.

One embodiment of the present invention provides a method is provided for scheduling software task execution. According to the method, at least one high priority software task that has a specified start time and at least one lower priority software task are accepted. There is determined a time remaining until the specified start time for the high priority software task, and there is determined if the lower priority software task can complete execution within the time remaining that was determined. The lower priority software task is executed only if it was determined to be able to complete execution within the time remaining, and the high priority software task is executed at or very near the specified start time. In a preferred embodiment, all incoming software tasks are placed on a task queue with a status of hold to prevent execution, the lower priority software task is executed by removing its status of hold so as to allow execution, and the high priority software task is executed by removing its status of hold so as to allow execution at or very near the specified start time.

Another embodiment of the present invention provides a software task execution scheduler that includes a software task receiver, an execution time generator, and a software task execution manager. The software task receiver accepts at least one high priority software task that has a specified start time and at least one lower priority software task. The execution time generator determines a time remaining until the specified start time for the high priority software task, and if the lower priority software task can complete execution within the time remaining. The software task execution manager executes the lower priority software task only if it was determined to be able to complete execution within the time remaining, and executes the high priority software task at or very near the specified start time. In one preferred embodiment, the software task execution scheduler also includes a queue manager that queues the high priority software task and the at least one lower priority software task for execution on an interconnected computer system.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

BRIEF DESCRIPTION OF THE DRAWINGS

FIGS. 5A, 5B and 5C illustrate a task queue sequence containing the status of an illustrative task queue at three points in time in accordance with an exemplary embodiment of the present invention; and FIG. 6 illustrates processing pseudo-code of a software task manager in accordance with an exemplary embodiment of the present invention.

DETAILED DESCRIPTION OF PREFERRED EMBODIMENTS

Preferred embodiments of the present invention will be described in detail hereinbelow with reference to the attached drawings.

Figure 1:
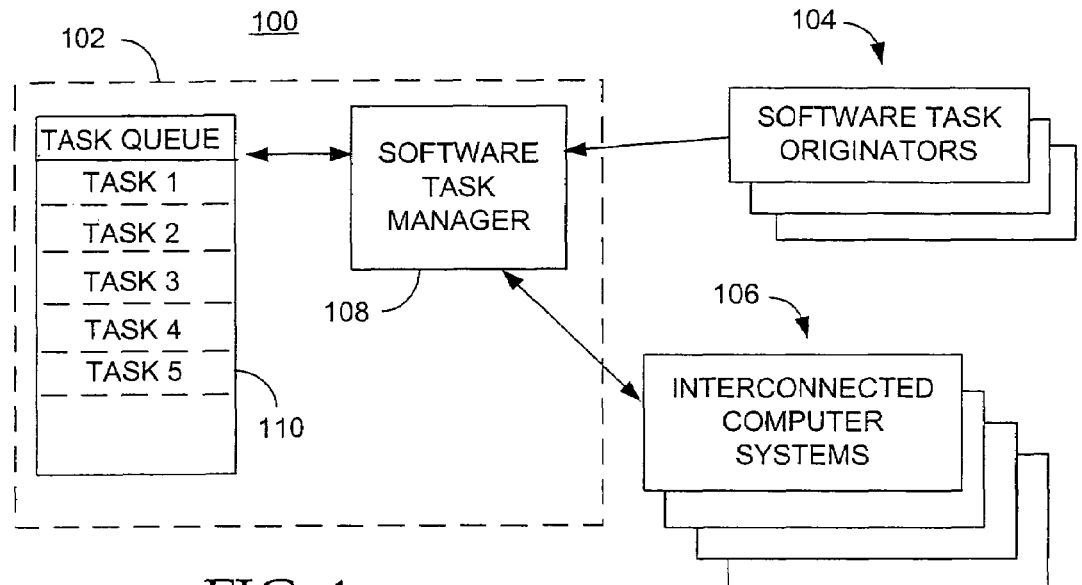
FIG. 1 is a schematic diagram of an operational environment for a software task manager in accordance with an exemplary embodiment of the present invention.

The exemplary embodiments of the present invention receive and manage software tasks that are to execute on a computer system. The software tasks of the exemplary embodiments are data processing programs that execute in a batch mode, i.e., programs that operate without human input after the program is configured to execute. A schematic diagram of an operational environment 100 for one embodiment of the present invention is illustrated in FIG. 1. The operational environment 100 is shown to include a plurality of software task originators 104. Alternative embodiments are able to have just one software task originator, but the teachings of the present invention are able to be used with one or more software task originators 104. Software task originators 104 are able to be terminal interfaces used by human users to submit software tasks for execution. The software task originators 104 are also able to include other software programs and processes that submit tasks to be executed by a computer. In embodiments of the present invention, a broad range of software tasks originators are able to utilize the software task scheduling system and methods described herein.

The operational environment 100 further includes a software task scheduling system 102. The software task scheduling system 102 of this embodiment includes a software task manager 108 that maintains a task queue 110. The task queue 110 is able to contain descriptors for zero or more software tasks that are awaiting execution on a computer. The software task manager 108 of this software task scheduling system 102 receives software tasks to be executed from the one or more software task originators 104. The submitted software tasks can be submitted with a specified start time. The submitted software task can have an execution priority that is used by the software task manager 108 to determine the order in which to execute the software tasks. The priority assigned to a particular software task is influenced by a number of factors including the software task originator that submitted the software task. Some embodiments allow the software task originator or other process to set the priority of a software task when the task is submitted. The software task manager 108 places the software tasks into the task queue 110 in a sequential order based upon the time that the software task was received and the priority assigned to the software task. Software tasks are often ordered in decreasing priority levels with tasks of the same priority ordered in the sequence in which they were submitted by the software task originators 104.

The software task manager 108 of the exemplary embodiment sets the status of each submitted software task. Submitted software tasks in the preferred embodiment are set to have a status of "system hold," whereby the software task is placed in the task queue 110 but not executed although all other criteria have been met. The software task can alternatively have a status of "idle," whereby the software task is submitted for execution when other criteria, such as the availably of computing resources and the absence of previously submitted or higher priority queued software tasks, have been satisfied.

In preferred embodiments, the software task manager 108 initially sets the status of all incoming software tasks to System Hold, and then changes the status of selected tasks to start their execution. More specifically, the software task manager 108 determines the time remaining until the specified start time for the software task with the earliest specified start time, and then determines if any of the software tasks without a specified start time can complete execution within this remaining time. When the specified start time arrives for the next task, the operation of the exemplary embodiment of the present invention ensures that no other tasks are executing and that task is started by the software task manager 108. Tasks that have a specified start time are also submitted to the task queue 110 with a high priority, so that when the software task manager 108 starts the task, by changing the status of the task to "idle," the task will be the first waiting task within the task queue 110. If there is a software task without a specified start time that can complete execution within the remaining time (i.e., prior to the time that the software task with the earliest specified start time will require the computing resources), that task is started. Thus, the software task manager of the present invention ensures that the necessary resources are available at or very near to the specified time, so that the processing task with the specified start time can start at or very near the specified start time.

The software task manager 108 in this exemplary embodiment further monitors the processing status of the interconnected computer system 106. In some embodiments, the software task manager of the present invention monitors and submits software tasks to only one computer. The interconnected computer system 106 of the exemplary embodiment is a computer cluster that contains several computers that are interconnected with high speed communications to facilitate parallel processing and distribution of tasks over the multiple computers contained within the interconnected computer system 106. Alternative embodiments of the present invention operate in conjunction with an interconnected computer system that include any number of computers that are interconnected via a conventional network or any other communications means.

In general, the software task manager 108 monitors the processing status of the interconnected computer system 106 in order to determine when processing resources are available to execute the software tasks that are stored within the task queue 110. Processing resources become available, for example, upon termination of the execution of a software task that was executing on one or more of the computer systems within the interconnected computer system 106. As computing resources become available, the software task manager 106 submits software tasks stored within the task queue 110 while ensuring that the necessary resources are available for any tasks with a specified start time. As described above, the software tasks that are submitted for execution are selected based upon the priority associated with the software task and the time at which the software tasks were submitted to the software task manager 108 by the software task originators 104. Alternative embodiments use different criteria to select the software tasks to submit for execution on the interconnected computer system 106.

Some embodiments of the present invention operate with an interconnected computer system 106 that supports executing a single software task upon multiple computers. Such parallel processing of a task is used to increase the speed and/or efficiency of executing lengthy or complex tasks. Each software task that operates upon multiple computer systems can specify a number of computing systems, or nodes, upon which the software task is to operate. Proper execution of these software tasks require that the specified number of nodes be available prior to submitting that task for execution. The required number of nodes, priority and time of submission by the software task originators, are used by these embodiments of the present invention to determine which tasks to submit for execution to the interconnected computer system.

Figure 2:
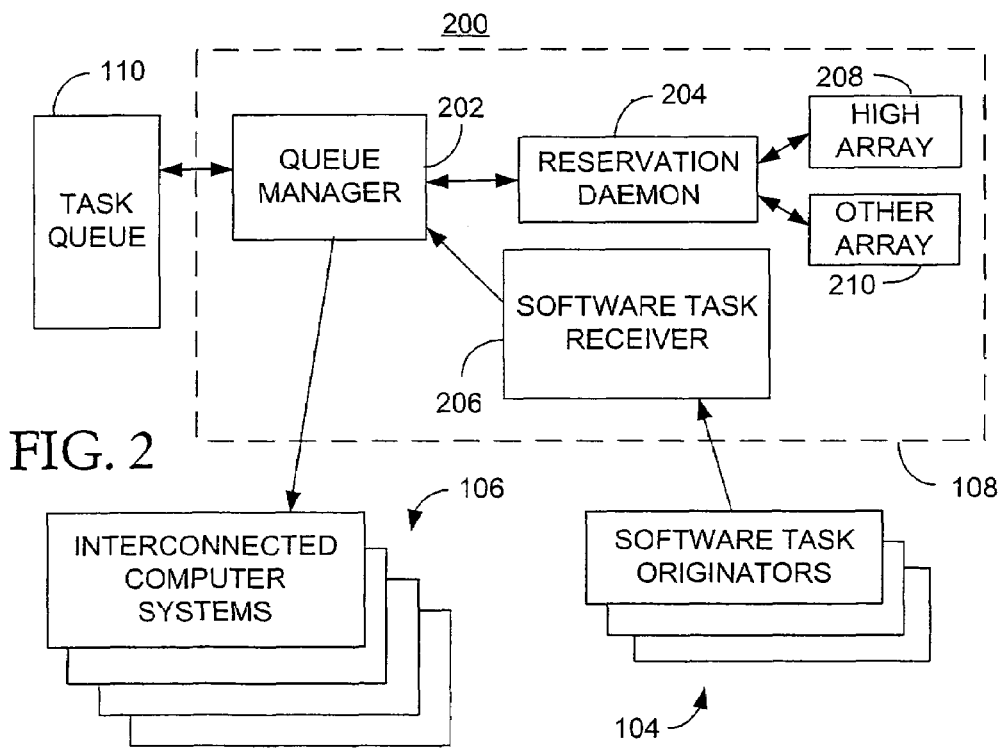
FIG. 2 is a schematic and data flow diagram of a software task management system operating in the operational environment in accordance with a preferred embodiment of the present invention.

A detailed processing schematic diagram 200 of a preferred embodiment of the present invention is illustrated in FIG. 2. The detailed processing schematic diagram 200 contains a more detailed illustration of the components of the software task manager 108 of the exemplary embodiment of FIG. 1. The software task manager 108 of this embodiment consists of a queue manager 202 that operates in conjunction with a reservation daemon 204 and a software task receiver 206. The queue manager 202 of this exemplary embodiment is the LoadLeveler software product available from International Business Machines Corporation (IBM). The LoadLeveler queue manager 202 manages the task queue 110 and submits software tasks to the interconnected computer system 106. The LoadLeveler queue manager 202 of the exemplary embodiment supports submitting software tasks that are submitted with a status that identifies the software task as "idle" or on "System Hold," as discussed above. The queue manager 202 of this exemplary embodiment includes an Application Program Interface (API) that allows a process with sufficient privileges to change the status of software tasks stored within the task queue 110, such as from "system hold" to "idle."

The software task receiver 206 receives tasks that are submitted by the software task originators 104. The software task is communicated to the software task receiver 206 via any known means. The software task receiver 206 accepts two classes of software tasks, conventional software tasks and scheduled software tasks. Scheduled software tasks, as processed by the exemplary embodiments of the present invention, are software tasks that have a specified time at which the software task is to begin execution. Conventional software tasks are software tasks submitted to the software task manager 108 that do not have a specified start time. The software tasks that are received by the software task receiver are able to have an associated set of specifications for several characteristics. These characteristic specifications are provided along with the software task and include, for example, the task priority, the number of processing nodes on which the software task is to be executed and an optional start time for the software task.

The software task receiver 206 retains the associated software task characteristics and places the received software task along with those characteristics into a software task wrapper. The software task wrapper of the exemplary embodiment contains all of the received characteristics that are associated with the software task but indicates that the status of the software task is "system hold." The software task receiver 206 of the exemplary embodiment passes the software task wrapper to the queue manager 202. The queue manager 202 inserts the software task into the task queue 110, but does not initiate execution of software tasks that have their status set to system hold. This allows the reservation daemon 204 to control software task execution, as is described below. The software task wrapper further defines the software task as belonging to one of the two possible classes. Software tasks with specified start times are placed into a high priority class and software tasks without specified start times are placed into a class referred to as the other priority class. Software tasks in the high priority class have an associated start time that is also specified in the task wrapper. These two classes are used to allow tasks with specified start times to start at or very near the specified time.

The task wrapper, which includes the received software task, is then provided to the queue manager 202 in the exemplary embodiment. This queue manager 202 then places the software task into the task queue 110. This software task, as with all software tasks provided to the queue manager 202 by the software task receiver 206, has a status of system hold and therefore does not execute. The queue manager 202 of the exemplary embodiment, through an Application Program Interface (API), allows external processes to query the status of the task queue 110 maintained by the queue manager 202. The reservation daemon 204 utilizes this API to determine the status of queued software tasks, as is described below.

The software task manager 108 further contains a reservation daemon 204. The reservation daemon operates to reserve computing resources for high priority software tasks (i.e., software tasks that have a specified start time) so that the high priority software tasks are able to execute when the specified start time occurs. The reservation daemon 204 of the exemplary embodiment maintains two arrays that hold descriptors of software tasks that are placed into the task queue 110. The high array 208 is used to store descriptors of queued software tasks that have scheduled start times and the other array 210 is used to store descriptors of queued software tasks that do not have scheduled start times.

Figure 3:
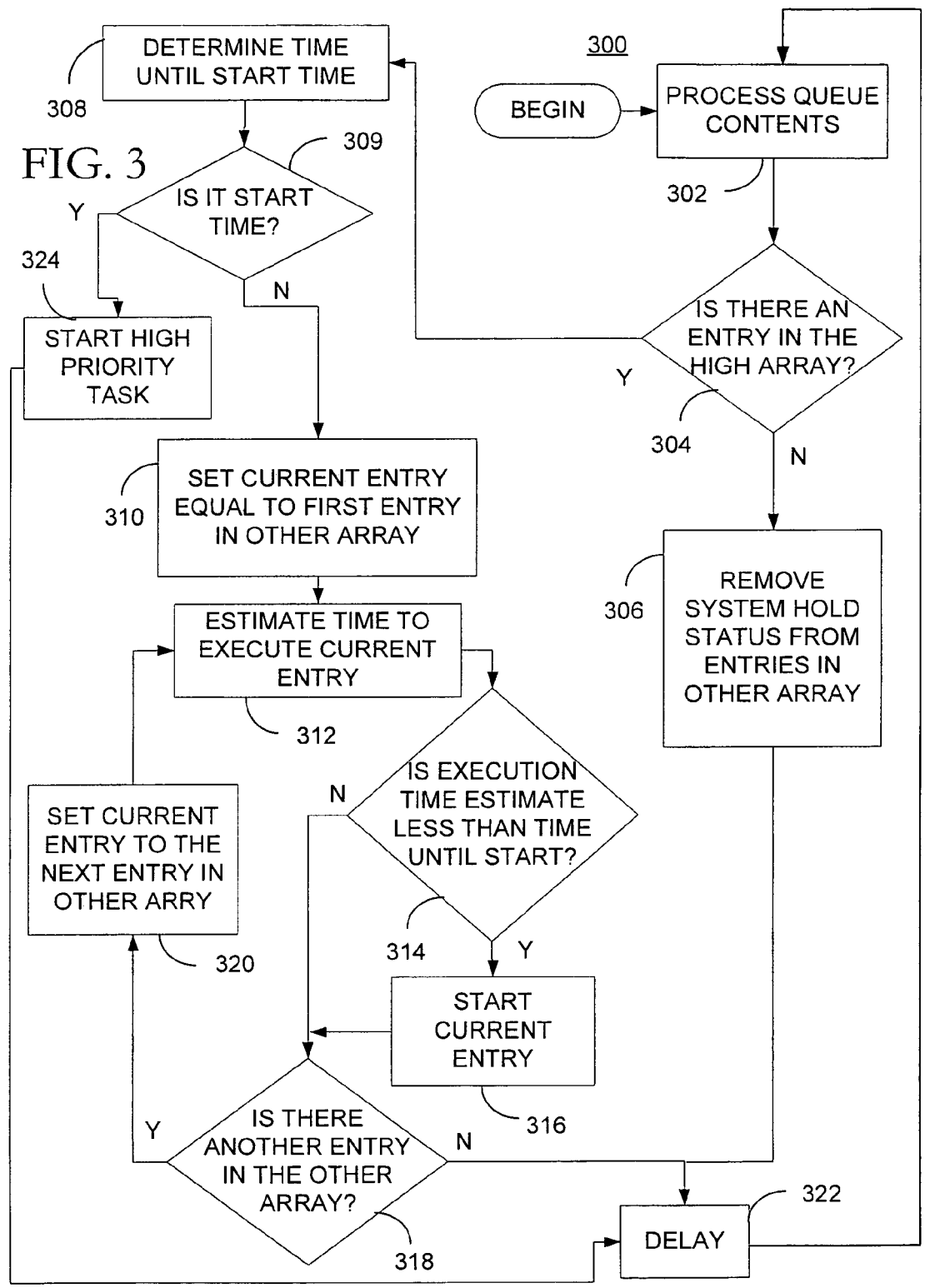
FIG. 3 is a process flow diagram for a computing resource reservation daemon in accordance with an exemplary embodiment of the present invention.

The reservation daemon processing flow 300 of the exemplary embodiment is illustrated in FIG. 3. This processing is also described in the software task manager processing 600 that is illustrated in FIG. 6. The exemplary reservation daemon processing flow 300 begins by processing, at step 302, the contents of the task queue 110, as is described in detail below. The processing of the process queue contents step results in the high array 208 and the other array having descriptors for each task within the task queue 110. The high array 208 has descriptors for queued software tasks that have scheduled start times and the other array 210 has descriptors for software tasks that do not have scheduled times. After processing the contents of the task queue 110, the processing determines, at step 304, if there are any entries within the high array 208.

If there are no entries within the high array 208, the processing then removes the system hold status, via a command to the queue manager 202, for all of the software tasks listed in the other array 210. This results in these software tasks having the status of "idle," which causes the queue manager 202 to submit those tasks to the interconnected computer system 106 for execution as computing resources for those software tasks becomes available. The other software tasks are placed into the idle state because there is no software task for which computing resources must be reserved for a specified future start time. After removing the system hold status, the reservation daemon processing flow 300 delays, at step 322, for a specified period of time prior to resuming the processing loop by returning to process the contents of the task queue 110. The exemplary embodiments allow the system operator to adjust the delay between loop iterations. For example, common system installations of the present invention utilize delay times of approximately ten to fifteen seconds.

Alternatively, if the high array 208 has an entry, at step 304, the processing continues by determining, at step 308, the time that is remaining until the specified start time of the first task within the high array. The entries in the high array 208 of the exemplary embodiment are ordered according to specified start times, with the first entry having the soonest specified start time. The time remaining is determined by determining the time difference between the specified start time for the first software task in the high array and the current time of day. The time remaining until this specified start time can be used to execute software tasks that are queued in the other array 210, as long as the necessary resources are available at the specified start time.

If the time remaining until the specified start time is zero or less (i.e., the start time has arrived or passed), at step 324 the next high priority task is "started." The exemplary embodiment "starts" software tasks by changing their status from "system hold" to "idle." The reservation daemon 204 causes this status change by issuing a command to the queue manager 202 via the API.

On the other hand, if the start time for the next high priority task is in the future, the processing then proceeds to examine each entry within the other array 210 to determine which tasks are able to be submitted for execution so as to leave the necessary resources available prior to the specified start time. The software task that corresponds to the first entry in the other array is set, at step 310, to the "current entry" for further processing. The processing then determines, at step 312, an estimate of the time that the software task associated with the current entry will require to execute. The estimate of the time to execute the software task associated with the current entry in the exemplary embodiment of the present invention is determined by the Backfill Scheduler function of the LoadLeveler queue manager.

A component of the Backfill algorithm is a user's specification of the WallClock time, i.e., the estimate of the time to execute for the software task, for any submitted task. This WallClock time is a user estimate of the time that the task will require the use of the computing resources. Users can measure code execution times to refine the WallClock estimate. Overestimates are used for newly developed software tasks or for software tasks for which previous execution time measurements have not been measured. The software task manager 108 of the exemplary embodiment only allows software tasks to execute for the user specified WallClock time. If the software task requires more time to execute than is specified in the estimate, the software task manager 108 will terminate the task. Since the task is terminated after the specified WallClock time, the resources used by that task are ensured to be available after the specified WallClock time.

Once the execution time for the software task associated with the current entry is calculated, the processing determines, at step 314, if the software task associated with the current entry is able to complete execution prior to the next specified start time for a high priority software task. If the software task associated with the current entry is able to complete processing within this time, the software task associated with the current entry is started, at step 316, by changing the status of the task from "on hold" to "idle." After the software task associated with the current entry is started, or if the software task associated with the current entry is not able to execute before the next specified start time of a high priority task, the processing then determines, at step 318, if there is another entry within the other array 210. If there is another entry within the other array 210, the processing sets, at step 320, this next entry to the software task associated with the current entry and continues the processing described above by estimating, at step 312, the time to execute this new current entry and performing the following steps. If there are no more entries within the other array, the processing continues by delaying, at step 322, prior to resuming the reservation daemon processing loop by processing the entries within the task queue 110 and performing the subsequent processing steps described above.

The reservation daemon processing flow 300 of the exemplary embodiment reserves processing resources so that a selected processing task can start at a specified time. The reservation daemon processing flow 300 of the exemplary embodiment includes receiving software tasks via the software task receiver 206 and having the software task receiver 206 submit the received tasks into the queue manager 202 with a status of "System Hold." The reservation daemon processing flow 300 of the exemplary embodiment further has a reservation daemon 204 that maintains two arrays of processing tasks, one array contains descriptors of processing tasks that have a specified start time and the other array contains descriptors of tasks that do not have a specified start time. These two arrays also contain execution time estimates for each task. The reservation daemon 204 of the exemplary embodiment periodically examines these two arrays to determine if tasks without specified start times can be submitted and complete their execution prior to the start time of the task with the next specified start time. If there are no more tasks with specified start times, the reservation daemon 204 then changes the status of the other tasks from "system hold" to "idle" so that they will be submitted for execution as resources become available.

Newly received processing tasks in the exemplary embodiments are submitted to the queue manager 202 with a status of "system hold." The "system hold" status prevents the processing task from executing, even if resources are available. The processing tasks are not submitted for execution in the exemplary embodiment until the reservation daemon changes the status of that task from "system hold" to "idle." This processing ensures that processing tasks are only submitted for execution upon a determination of the reservation daemon to do so. This prevents processing tasks from "slipping by" and being submitted for execution between iterations of the reservation daemon 204 processing.

The reservation daemon processing flow 300 of the exemplary embodiment advantageously ensures that resources will be available at or very near to the specified time for a processing task that has a specified start time. This allows the processing task to start at or very near to its specified start time and that the task will complete at or very near to the estimated completion time for that task. The present invention further allows other tasks, i.e., those tasks without a specified start time, to execute as long as they will not use resources that will be required by a processing task with a specified start time. The exemplary embodiment of the present invention implements this functionality by using a conventional queue manager (i.e., the LoadLeveler program available from IBM) in conjunction with additional software components. An embodiment of the present invention consists of additional software components are primarily written in the Perl software language with some software written in the "C" language.

Figure 4:
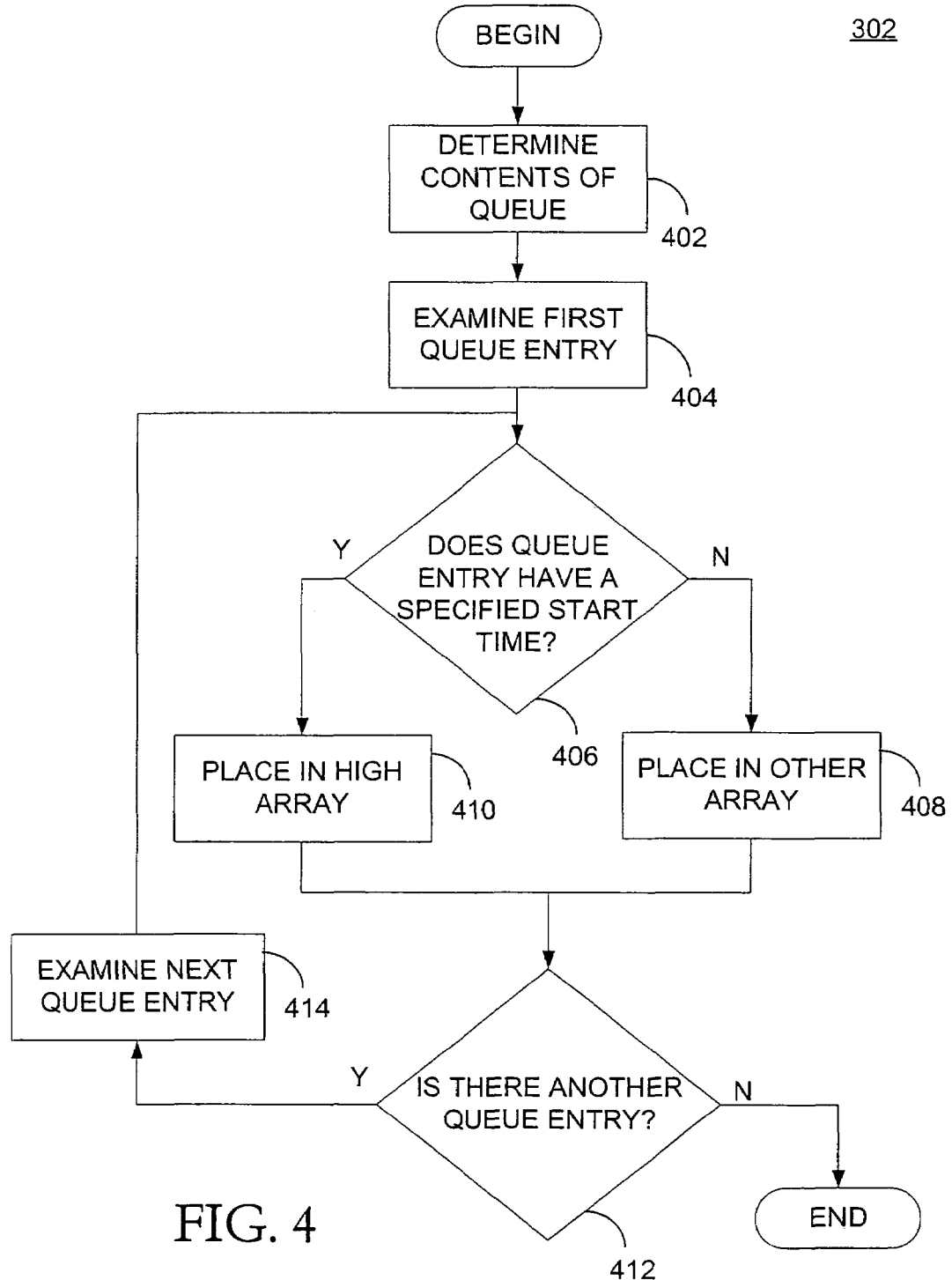
FIG. 4 is a processing flow diagram for processing the contents of a software queue by the computing resource reservation daemon in accordance with an exemplary embodiment of the present invention.

The process queue contents processing flow 302 of an exemplary embodiment is illustrated in FIG. 4. The exemplary process queue contents processing flow 302 is performed at the beginning of the reservation daemon processing flow 300 in the embodiment of FIG. 3. The process queue contents processing flow 302 is used by the reservation daemon 204 to determine contents of the task queue 110 and to store data used by the reservation daemon precessing flow 300. The process queue contents processing flow 302 begins by determining, at step 402, the contents of the task queue 110. The contents of the task queue is determined in the exemplary embodiments via a subprogram written in the "C" programming language that uses an API provided by the queue manager 202. Once the contents of the task queue 110 are determined, the processing sets, at step 404, the first queue entry for examination. If the queue entry being examined is determined, at step 406, to have a specified start time, the processing advances to place, at step 410, a descriptor of the software task associated with the queue entry being examined into the high array 208. If the software task associated with the queue entry being examined is determined to not have a specified start time, the processing places, at step 408, a descriptor of the software task associated with that queue entry into the other array 210.

After placing a descriptor for the queue entry being examined into either the high array 208 or the other array 210, the processing then determines, at step 412, if there is another queue entry to examine. If there is, the processing sets, at step 414, that next queue entry for examination and reiterates the processing described above by determining, at step 406, whether this next queue entry that is being examined has a specified start time, and then performing the subsequent steps. If there are no other queue entries, the process then finishes.

In the interests of simplicity and clarity, these processing flows describe the processing that is performed for a single processing node, or computer system, within the interconnected computer system 104. This processing is easily applied to managing execution of tasks upon multiple computer or nodes. The processing of the exemplary embodiment reserves the specified number of processing nodes within the computer cluster to support proper execution of a software task that has a scheduled start time and that requires multiple nodes to properly execute by ensuring that the processing of other software tasks on the required number of nodes are all complete before that scheduled start time. Alternative embodiments that utilize other architectures for the interconnected computer system 104 use similar processing.

An exemplary task queue sequence 500 for an embodiment of the present invention is illustrated in FIGS. 5A–5C. The exemplary task queue sequence 500 illustrates the contents of the task queue 110 at three points in time over a fourteen hour period. The data illustrated in this sequence are for purposes of clearly showing the progression of software task status during this time frame and are not meant to be an inclusive view of all of the data contained within the task queue 110. The data stored in the task queue 110 of the exemplary embodiment also includes the data stored in conventional task queues. The illustrated data has also been abbreviated for clarity of illustration and does not show the exhaustive detail of data stored within the task queue 110 for each software task. For example, the time parameters for CURRENT TIME and START TIME in the actual task queue 110 include a specification of the day as well as the hour.

The exemplary sequence 500 illustrates the status of the task queue 110 as it exists at 6 PM, 4 AM and 8 AM for the exemplary scenario. In this exemplary scenario, there are eight available processing nodes and the maximum estimated execution time for any one software task is fourteen hours. The TASK ID column contains a unique identifier for each software task that is in the task queue. The NODES column of these status illustrations indicates the number of processing nodes, or computer system, that the software task requires to execute (i.e., the number of nodes necessary to execute the software task in parallel). The EXEC TIME column indicates the estimated amount of time that the software task will require to execute. The exemplary embodiment accepts estimates of execution times from the user that is submitting the software task. Other embodiments incorporate automated processes to estimate execution time. The START TIME column indicates the specified start time for the software task, if one has been specified. The STATE column indicates the state of the software task at the illustrated time. The state of the software tasks are able to be either SysHold, DEFER, IDLE or RUN. A software task with a SysHold, or system hold, state is not ready to be submitted for execution and will remain in the queue. A task in the DEFER state is a high priority task that is awaiting the specified start time before it is submitted for execution. A software task in an IDLE state is in the queue and ready to be submitted for execution when computing resources are available. A software task in a RUN state is currently executing.

The 6 PM task queue status 502 of FIG. 5A shows that one software task, the software task with TASK ID H1, has been submitted with a specified start time of 8 AM. The other tasks in the queue at this time do not have specified start times and therefore are conventional software tasks. Also shown for all of the software tasks is the specified number of nodes that are required for that software task to execute. The estimated execution time for the tasks is shown in this example ranges between 1 and 14 hours. At 6 PM, software tasks J100 and J200, which require six nodes and one node, respectively, are executing. One node of this eight node system is free when software tasks J100 and J200 are executing. The software task identified as J1 is at the "top" of the task queue 110, requires only one node and requires ten hours to execute. At 6 PM, software task J1 is submitted for execution because only one node is available there are fourteen hours until the next scheduled task start time at 8 AM. The 6 PM task queue status 502 indicates that software task J1 is submitted for execution on one node and is in transition from IDLE to RUN.

The 4 AM task queue status 504, shown in FIG. 5B, illustrates that software tasks J200 and J1 have completed execution. Software task J100 is still executing, and is using six of the eight available processing nodes. At 4 AM, there are four hours left until the scheduled start time for task H1 and two processing nodes are available. Software task J3 requires two nodes to execute and is estimated to require one hour to execute. There is therefore sufficient time and processing nodes available for software task J3 to execute prior to the scheduled start time of software task H1. The 4 AM task queue status 504 shows that the status of software task J3 is changed to IDLE, and is in transition to RUN.

The 8 AM task queue status 506, shown in FIG. 5C, illustrates that software task J100 has completed execution and that software task H1, which is scheduled to start at this time, is in transition from DEFER to IDLE and then to RUN. This can occur because the required number of nodes, eight in this example, have been reserved by the operation of the software task manager 108 of the exemplary embodiment of the present invention.

Unlike conventional software task management facilities, the exemplary embodiments of the present invention provide a system and method for reserving computer resources in order to allow initiation of the execution of particular processing task at or very near a specified time in the future. Conventional software task management facilities allow selected processing tasks to be submitted with a high priority, but they do not attempt to manage the execution of multiple processing tasks in an execution queue so as to schedule the start time of a processing task for a certain time of day. The exemplary embodiment advantageously utilizes a queue manager, such as the LoadLeveler product available from IBM, to manage execution queues and distribution of complex processing tasks among the processing nodes of a computer cluster. The exemplary embodiments add the components of a software task receiver and a reservation daemon to this existing system to manage software task execution so as to reserve computing resources for the initiation of the execution of a scheduled software task.

The present invention can be realized in hardware, software, or a combination of hardware and software. Any kind of computer system—or other apparatus adapted for carrying out the methods described herein—is suited. A typical combination of hardware and software could be a general purpose computer system with a computer program that, when loaded and executed, controls the computer system such that it carries out the methods described herein.

The present invention can also be embedded in a computer program product, which comprises all the features enabling the implementation of the methods described herein, and which—when loaded in a computer system—is able to carry out these methods. In the present context, a "computer program" includes any expression, in any language, code or notation, of a set of instructions intended to cause a system having an information processing capability to perform a particular function either directly or after either or both of the following: a) conversion to another language, code, or notation; and b) reproduction in a different material form.

Each computer system may include one or more computers and a computer readable medium that allows the computer to read data, instructions, messages, or message packets, and other computer readable information from the computer readable medium. The computer readable medium may include non-volatile memory such as ROM, Flash memory, a hard or floppy disk, a CD-ROM, or other permanent storage. Additionally, a computer readable medium may include volatile storage such as RAM, buffers, cache memory, and network circuits. Furthermore, the computer readable medium may include computer readable information in a transitory state medium such as a network link and/or a network interface (including a wired network or a wireless network) that allow a computer to read such computer readable information.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A computer implemented method for scheduling software task execution, the method comprising:
    accepting a high priority software task that has a specified start time;
    accepting at least one lower priority software task;
    determining a time remaining until the specified start time for the high priority software task;
    determining an execution time estimate for the lower priority software task;
    determining if the lower priority software task can complete execution within the time remaining that was determined;
    executing the lower priority software task only if it was determined to be able to complete execution within the time remaining;
    determining if the lower priority software task has been executing for longer than the execution time estimate;
    terminating, in response to determining that the lower priority software task has been executing for longer than the execution time estimate, execution of the lower priority software task; and
    executing the high priority software task at or very near the specified start time.

2. The computer implemented method as defined in claim 1, further comprising queuing the high priority software task into a first array and queuing the at least one lower priority software task into a second array for execution on an interconnected computer system.

3. The computer implemented method as defined in claim 1, further comprising:
  submitting all incoming software tasks, including the high priority software task and the at least one lower priority software task, to a queue manager with a status of hold to prevent execution,
  wherein the executing the lower priority software task comprises providing a command to the queue manager to cause the queue manager to remove the status of hold for the lower priority software task so as to allow execution, and
  wherein the executing the high priority software task comprises providing a command to the queue manager to cause the queue manager to remove the status of hold from the high priority task so as to allow execution of the high priority task at or very near the specified start time.

4. The computer implemented method as defined in claim 3, further comprising:
  querying the queue manager to determine a respective priority for all software tasks within the at least one task queue;
  determining if any of the software tasks within the at least one task queue is a higher priority task that has a specified start time; and
  providing, in response to determining that any software tasks within the at least one task queue is a higher priority task that has a specified start time, a command to the queue manager to cause the queue manager to remove the status of hold from all software tasks within the at least one task queue.

5. The computer implemented method as defined in claim 1, wherein the accepting at least one high priority software task comprises receiving a respective specified start time for each of the at least one high priority software task.

6. A software task execution scheduler computing node comprising:
  a software task receiver for accepting a high priority software task that has a specified start time and at least one lower priority software task;
  an execution time generator for determining an execution time estimate for the lower prority software task and for determining a time remaining until the specified start time on a computer for the high priority software task, and if the lower priority software task can complete execution on the computer within the time remaining; and
  a software task execution manager for;
    initiating execution on the computer of the lower priority software task only if it was determined to be able to complete execution on the computer within the time remaining,
    determining if the lower priority software task has been executing for longer than the execution time estimate,
    terminating, in response to determining that the lower priority software task has been executing for longer than the execution time estimate, execution of the lower priority software task,
    and executing the high priority software task on the computer at or very near the specified start time.

7. The software task execution scheduler computing node as defined in claim 6, further comprising a queue manager for queuing the high priority software task into a first array and for queuing the at least one lower priority software task into a second array for execution on an interconnected computer system.

8. The software task execution scheduler computing node as defined in claim 6, further comprising:
  a software task receiver for submitting all incoming software task, including the high priority software task and the at least one lower priority software task, to a queue manager with a status of hold to prevent execution,
  wherein software task execution manager executes the lower priority software task by providing a command to the queue manager to cause the queue manager to remove the status of hold for the lower priority software task so as to allow execution, and executes the high priority software task by providing a command to the queue manager to cause the queue manager to remove the status of hold from the high priority task so as to allow execution of the high priority task at or very near the specified start time.

9. The software task execution scheduler computing node as defined in claim 8, wherein the execution time generator queries the queue manager to determine a respective priority for all software tasks within the at least one task queue, determines if any of the software tasks within the at least one task queue is a higher priority task that has a specified start time; and provides, in response to determining that any software tasks within the at least one task queue is a higher priority task that has a specified start time, a command to the queue manager to cause the queue manager to remove the status of hold from all software tasks within the at least one task queue.

10. The software task execution scheduler computing node as defined in claim 6, wherein the software task receiver accepts at least one high priority software task comprises receiving a respective specified start time for each of the at least one high priority software task.

11. A computer program product encoded with computer instructions to be executed by a computer for scheduling software tasks, the computer instructions comprising instructions for:
  accepting a high priority software task that has a specified start time;
  accepting at least one lower priority software task;
  determining a time remaining until the specified start time for the high priority software task;
  determining an execution time estimate for the lower priority software task;
  determining if the lower priority software task can complete execution within the time remaining that was determined;
  executing the lower priority software task only if it was determined to be able to complete execution within the time remaining;
  determining if the lower priority software task has been executing for longer than the execution time estimate;
  terminating, in response to determining that the lower priority software task has been executing for longer than the execution time estimate, execution of the lower priority software task; and
  executing the high priority software task at or very near the specified start time.

12. The computer program product as defined in claim 11, further comprising instructions for queuing the high priority software task into a first array and queuing the at least one lower priority software task into a second array for execution on an interconnected computer system.

13. The computer program product as defined in claim 12, further comprising instructions for:
   submitting all incoming software tasks, including the high priority software task and the at least one lower priority software task, to a queue manager with a status of hold to prevent execution,
   wherein in the instructions for executing the lower priority software task comprises providing a command to the queue manager to cause the queue manager to remove the status of hold for the lower priority software task so as to allow execution, and
   wherein the instructions for executing the high priority software task comprise instructions for providing a command to the queue manager to cause the queue manager to remove the status of hold from the high priority task so as to allow execution of the high priority task at or very near the specified start time.

14. The computer program product as defined in claim 13, further comprising instructions for:
   querying the queue manager to determine a respective priority for all software tasks within the at least one task queue;
   determining if any of the software tasks within the at least one task queue is a higher priority task that has a specified start time; and
   providing, in response to determining that any software tasks within the at least one task queue is a higher priority task that has a specified start time, a command to the queue manager to cause the queue manager to remove the status of hold from all software tasks within the at least one task queue.

15. The computer program product as defined in claim 11, wherein the instructions for accepting at least one high priority software task comprise instructions for receiving a respective specified start time for each of the at least one high priority software task.

* * * * *